(12) United States Patent
Buck et al.

(10) Patent No.: US 7,454,991 B2
(45) Date of Patent: Nov. 25, 2008

(54) MULTISPEED MANUAL TRANSMISSION

(75) Inventors: Gerhard Buck, Friedrichshafen (DE); Wolfgang Rebholz, Friedrichshafen (DE); Siegfried Stützle, Friedrichshafen (DE); Michael Riedhammer, Bermatingen (DE); Hugo Burkhart, Ravensburg (DE); Michael Herlitzek, Eriskirch (DE); Jürgen Legner, Friedrichshafen (DE); Jochen Schneider, Neukirch (DE); Michael Thielmann, Friedrichshafen (DE); Roland Fischer, Oberteuringen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 382 days.

(21) Appl. No.: 10/585,958

(22) PCT Filed: Dec. 14, 2004

(86) PCT No.: PCT/EP2004/014202

§ 371 (c)(1),
(2), (4) Date: Jul. 13, 2006

(87) PCT Pub. No.: WO2005/071286

PCT Pub. Date: Aug. 4, 2005

(65) Prior Publication Data

US 2007/0068294 A1    Mar. 29, 2007

(30) Foreign Application Priority Data

Jan. 21, 2004    (DE)    ............ 10 2004 002 969

(51) Int. Cl.
*F16H 3/08*    (2006.01)

(52) U.S. Cl. .......................... 74/331; 74/360
(58) Field of Classification Search ............ 74/331, 74/340, 360
See application file for complete search history.

(56) References Cited

U.S. PATENT DOCUMENTS

| 4,549,443 | A | * | 10/1985 | White ............... 74/360 |
| 5,249,475 | A | * | 10/1993 | McAskill ............ 74/331 |
| 5,524,500 | A | | 6/1996 | Rebholz et al. |
| 5,592,853 | A | | 1/1997 | Rebholz et al. |
| 5,743,142 | A | * | 4/1998 | Leber et al. ......... 74/331 |
| 5,787,756 | A | | 8/1998 | Leber et al. |
| 5,819,587 | A | | 10/1998 | Leber et al. |
| 6,709,356 | B2 | | 3/2004 | Führer et al. |
| 2003/0136208 | A1 | * | 7/2003 | Calvert ............ 74/331 |

FOREIGN PATENT DOCUMENTS

| DE | 101 36 231 A1 | 2/2003 |
| EP | 0 673 480 A | 9/1995 |
| EP | 0 673 481 A | 9/1995 |
| EP | 0 759 129 A | 2/1997 |
| EP | 0 759 130 A | 2/1997 |
| EP | 0 796 400 A | 9/1997 |
| GB | 2 178 550 A | 12/1986 |

* cited by examiner

*Primary Examiner*—Ha D. Ho
(74) *Attorney, Agent, or Firm*—Davis Bujold & Daniels P.L.L.C.

(57) ABSTRACT

A shiftable multispeed reverse transmission having one input shaft (1) and a plurality of countershafts (2, 3, 4, 5, 6, 7) and one output shaft (8). One of gears and/or idle gears being situated upon the countershafts (2, 3, 4, 5, 6, 7) for non-rotatably connection with the countershafts, via shiftable clutches, for gear and direction change. The reduction ratios being generated by spur pinion stages and at least one shiftable planetary stage (P).

8 Claims, 3 Drawing Sheets

Gear Numbers

| I | II | III |
|---|---|---|
|   | 105 | 112 |
| 103 | 110 | 203 |
| 115 | 116 |   |
| 102 | 202 |   |
| 104 | 111 | 204 |
|   | 106 | 113 |
|   | 107 | 117 |
|   |   | 108 |

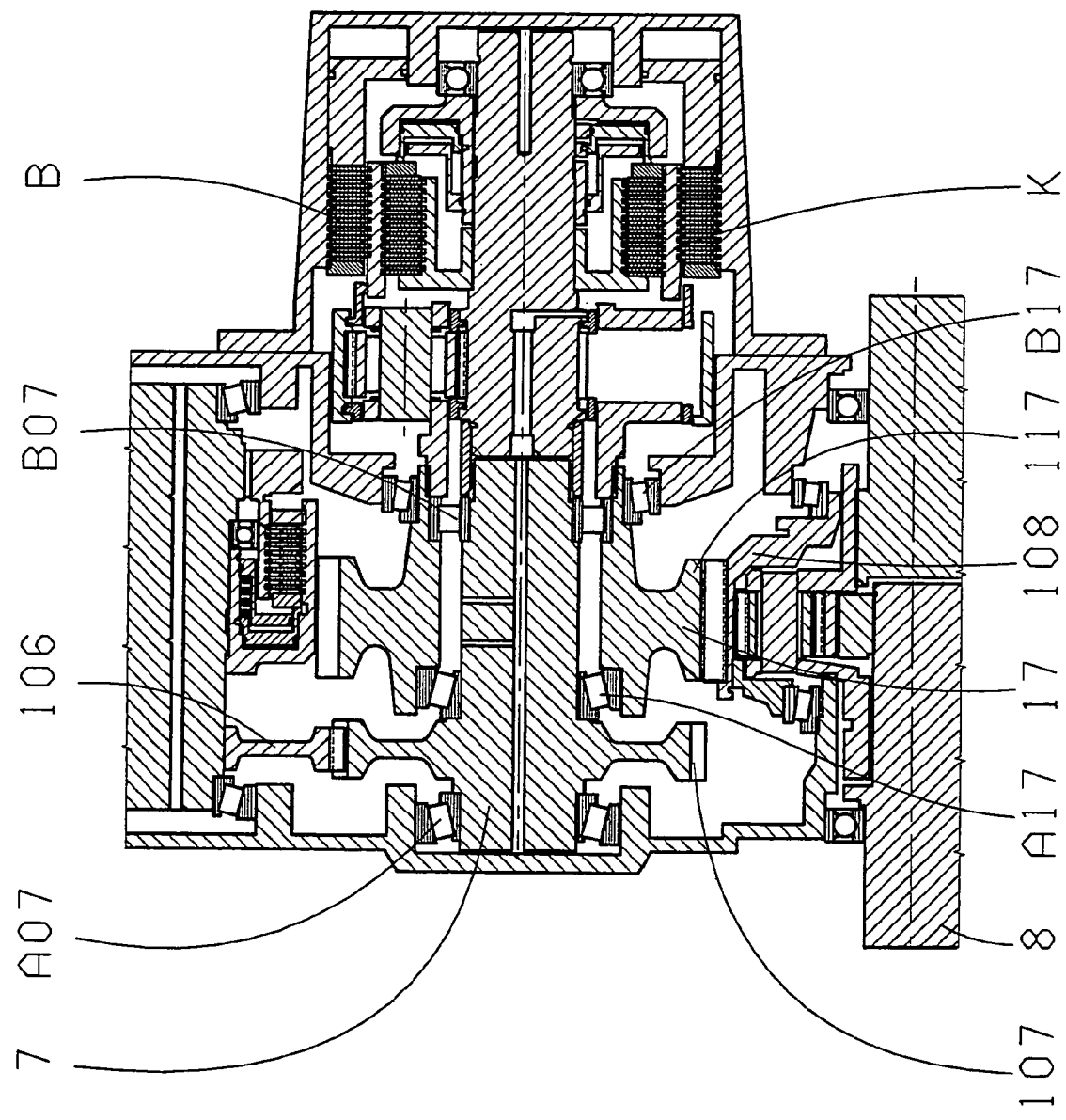

MULTISPEED MANUAL TRANSMISSION

This application is a national stage completion of PCT/EP2004/014202 filed Dec. 14, 2004 which claims priority from German Application Serial No. 10 2004 002 969.5 filed Jan. 21, 2004.

FIELD OF THE INVENTION

This invention relates to a multispeed manual transmission comprising one input shaft, countershafts, gears and/or idle gears non-rotatably connectable via shifting clutches with the countershafts for gear or direction change being disposed upon the countershafts and one output shaft.

BACKGROUND OF THE INVENTION

The transmissions that are usually employed in dumpers, loaders, excavation loaders and lift trucks, and also used in vehicles operated on the road such as mobile cranes. Here are involved, as a rule, powershift transmission with front-mounted hydrodynamic torque converters where a continuous and automatic torque increase can be obtained during an increase of the working resistance of the motor vehicle such as a construction machine. Driving torques of the transmission can be produced driving torques of the transmission which correspond to about a triple value of the motor torque.

The power flow in the individual gears of a transmission of the above mentioned kind is produced by a combination of the hydraulically shiftable clutches. The clutches must be shiftable under load for the reversal in loaders, among others, and therefore, can absorb much energy. The design of the housing and the arrangement of the shafts of the transmission must be adapted to the application.

Within the scope of the Applicant's EP 0 759 129 B1 is described a multispeed reverse transmission shiftable under load having at least one input shaft, countershafts and gears which form an input gearset and shifting clutches situated on the countershafts with idle gears which can optionally be no-rotatably connected with one of the countershafts for gear and direction change. One fixed gear and idle gears in constant mesh therewith form the input gearset; in addition, one fixed gear situated on a countershaft and inconstant mesh with two idle gears form an output gear chain; the countershafts are interconnected by fixed gears and one idle gear. Another such transmission is the object of the Applicant's EP 0 796 400 B1.

The problem on which this invention is based is to outline a shiftable multispeed reverse transmission having a higher power compared to the prior art. Besides, the inventive transmission must have good efficiency and be sturdy.

SUMMARY OF THE INVENTION

Accordingly, a transmission shiftable under load is proposed which comprises one input shaft, countershafts, gears and/or idle gears non-rotatably connected with the countershafts, via shifting clutches, for gear and direction change being located on the countershafts, and one output shaft, the reduction ratio is generated by spur pinion stages and at least one shiftable planetary stage.

According to the invention, depending on the clutch states, two power lows are produced which respectively meet on the same fixed gear. The planetary stage is preferably in power flow direction located between the fixed gear and the output shaft. Depending on the transmission version, the transmission can be designed as a four-gear or as an eight-gear transmission.

BRIEF DESCRIPTION OF THE DRAWINGS

The invention will now be described, by way of example, with reference to the accompanying drawings in which:

FIG. 3 is a preferred embodiment of the bearing arrangement for the shaft having the planetary stage.

DETAILED DESCRIPTION OF THE INVENTION

Figures 1, 1A:
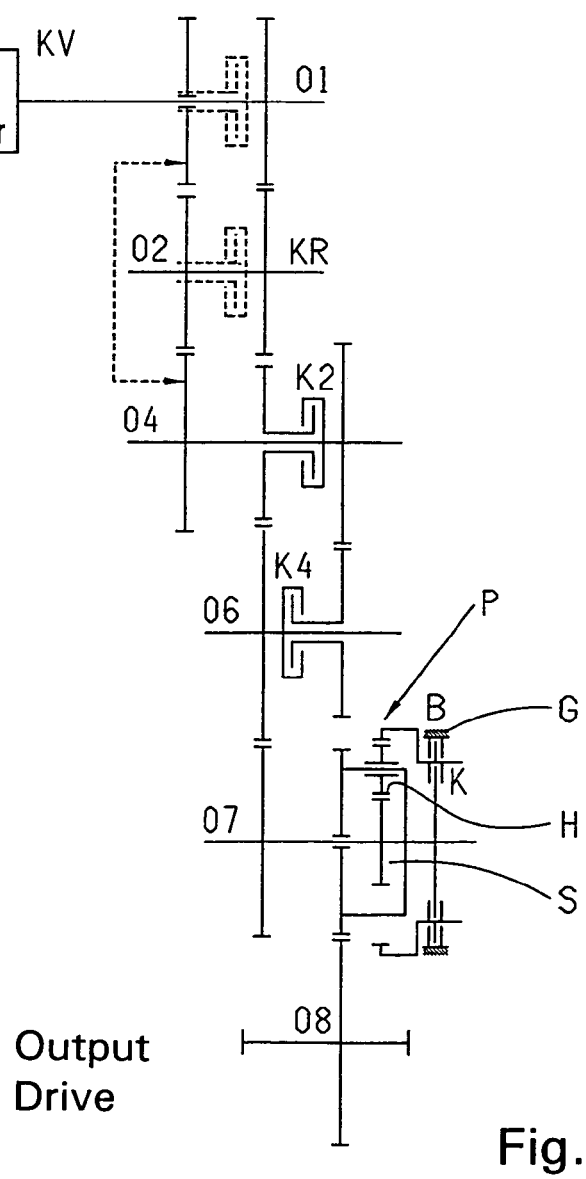
FIG. 1 is a diagram of an inventive transmission especially adequate for a loader.
FIG. 1A is a representation of the gear numbers corresponding to the transmission of FIG. 1.

The transmission shown in FIG. 1, which is especially adequate for a loader, comprises one input shaft 1 upon which is situated one powershift clutch KV (forward clutch) by way of which an idle gear 115 can be non-torsionally connected with the input shaft 1. Upon the shaft 1 is, in addition, provided with one fixed gear 116, which is in constant mesh with a fixed gear 202 of a countershaft 2. Upon the countershaft 2 is provided one powershift clutch KR (reverse clutch) which loosely non-torsionally connects an idle gear 102 with the countershaft 2. The idle gear 102 and the idle gear 115 of the input shaft are in constant mesh with a fixed gear 104 upon a countershaft 4; upon the countershaft 4 are additionally provided one idle gear 111 non-torsionally connectable with the countershaft 4 via a clutch K2 and one fixed gear 204, the idle gear 111 being in constant mesh with a fixed gear 106 located upon a countershaft 6 and the fixed gear 204 is in constant mesh with an idle gear 113 situated upon the countershaft 6. As is to be understood from FIG. 1, the idle gear 113 can be non-torsionally connected via a clutch K4 with the countershaft 6.

The fixed gear 106 of the countershaft 6 is in constant mesh with a fixed gear 107 located on a countershaft 7. Upon the shaft 7 is provided one idle gear 117 which is in constant mesh with one fixed gear 108 situated on an output shaft 8. According to the invention, in power flow direction between the fixed gear 107 and the fixed gear 108 of the output shaft 8, a shiftable planetary stage P is situated, the sun gear of which is non-torsionally connected with the countershaft 7. One brake B is provided which connects a hollow gear H with a housing G. In addition, two components of the planetary stage, preferably the sun gear with the hollow gear, are loosely interconnectable via a clutch K. If the brake B is now engaged and the clutch K open, the power is then transmitted from the fixed gear 107, via the planetary stage P to the idle gear 117. On the other hand, when the brake B is disengaged and the clutch K engaged, the power is directly transmitted from the fixed gear 107 to the idle gear 117 without any change of ratio. (The planetary stage rotates in the block operation.)

This transmission has four forward and four reverse gears, two other shifting elements in two power flows being each alternatively actuated to implement the gears when the forward clutch KV is engaged for the forward gears and the reverse clutch KR for the reverse gears. The clutches KR and KV suffice to meet the reversal requirements placed on a loader, since they can be shifted under load. For the first forward gear, together with the clutch KV, the clutch K2 and the brake B are engaged, the gears 115, 104, 111, 106, 107, planetary stage, 117 and 108 transmitting the power to the output shaft. The second forward gear results by engaging the brake B and the clutch K4; the power is transmitted by the gears 115, 104, 204, 113, 106, 107, planetary stage, 117 and 108 to the output shaft. For the third forward gear, the clutches K2 and K are engaged, the gears 115, 104, 111, 106, 107, 117 and 108 transmitting the power to the output shaft 8. To engage the fourth forward gear, the clutches K4 and K are engaged so that the power is transmitted via the gears 115, 104, 204, 113, 106, 107, 117 and 108 to the output shaft 8.

For the reverse gears, the clutch KR is engaged. The first reverse gear results here by engaging the clutch K2 and of the brake B; the power is transmitted from the input shaft 1 via the gears 116, 202, 102, 104, 111, 106, 107, planetary stage, 117 and 108 to the output shaft 8. The second reverse gear results by engaging the clutch K4 and of the brake B, the power being transmitted via the gears 116, 202, 102, 104, 204, 113, 106, 107, planetary stage, 117 and 108 to the output shaft 8. According to the invention, the third reverse gear is engaged by engaging the clutches K2 and K, the power being transmitted via the gears 116, 202, 102, 104, 111, 106, 107, 117 and 108 to the output shaft 8. Finally, for the fourth reverse gear, the clutches K4 and K are engaged; the gears 116, 202, 102, 104, 204, 113, 106, 107, 117 and 108 transmitting the power to the output shaft 8.

According to the invention, therefore, depending on the clutch states two power flows can be produced which meet on the same fixed gear 107, the fixed gear not being situated upon the output shaft 8.

By substituting for the clutches KV and KR through input shaft 1, two synchronizer units or dog clutches SV and SR and adding two other countershafts 3 and 5 with corresponding gears and clutches, an eight gear transmission advantageously results which is especially adequate for dumpers.

Figures 2, 2A:
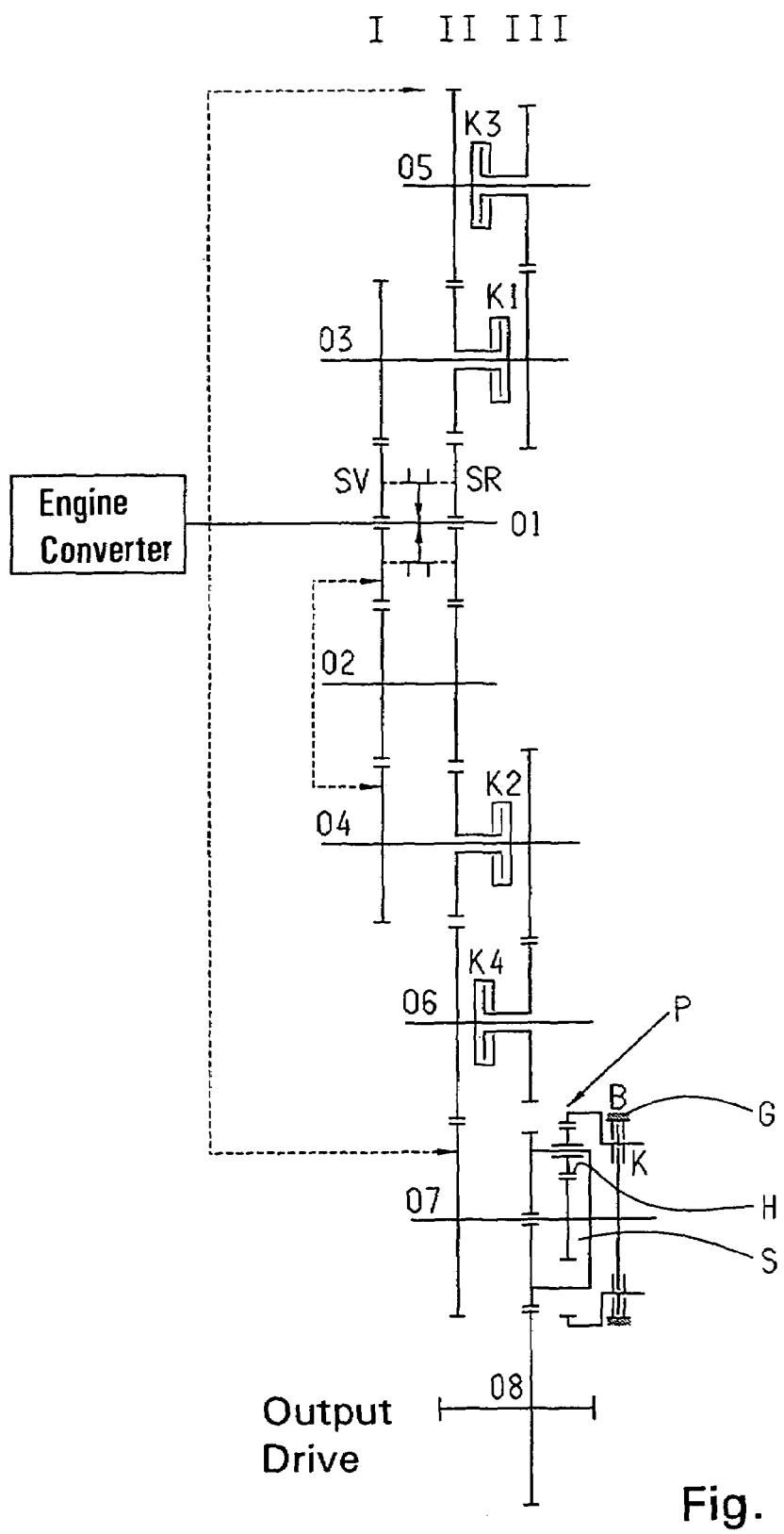
FIG. 2 is a diagram of an inventive transmission especially adequate for a dumper.
FIG. 2A is a representation of the gear numbers corresponding to the transmission of FIG. 2.

One such transmission is the object of FIG. 2. The eight-gear transmission accordingly differs from the transmission shown in FIG. 1 by the fact that upon the countershaft 2, no shifting element is situated and that upon the input shaft, instead of the clutch KV, two synchronizer units or dog clutches SV and SR are placed (respectively for the forward and reverse gears, it being possible to shift when the vehicle is stopped). The synchronizer units or dogs can be designed as double or single synchronizer units or also as dog clutches. Further provided is one other countershaft 3 which has two fixed gears 103 and 203 and one idle gear 110 non-torsionally connectable with the countershaft 3 via a clutch K1 provided on the countershaft 3, the fixed gear 103 being in constant mesh with the idle gear 115 of the input shaft 1.

One other countershaft 5 is, in addition, provided having one fixed gear 105 which is in constant mesh with the idle gear 110 of the countershaft 3 and one idle gear 112 non-torsionally connectable with the countershaft 5 via a clutch K3 provided on the countershaft 5. The idle gear 112 is here in constant mesh with the fixed gear 203 of the countershaft 3; the fixed gear 105 is in constant mesh with the fixed gear 107 disposed on the countershaft 7.

To implement the eighth forward and eighth reverse gears, when the clutches SV and SR, respectively, for the forward and reverse gears are engaged, each two other shifting elements are alternatively actuated in two power flows.

The first gear of the transmission, according to FIG. 1, corresponds here to the second gear, the second gear of the transmission to FIG. 1 to the fourth gear, the third gear of the transmission, according to FIG. 1, to the sixth gear and the fourth gear of the transmission, according to FIG. 1, to the eighth gear.

Accordingly, the first forward gear results by engaging the SV, of the clutch K1 and of the brake B; the power is transmitted by the gears 115, 103, 110, 105, 107, planetary stage, 117 and 108. For the second forward gear, the clutch K2 of the brake B are engaged, the gears 115, 104, 111, 106, 107, planetary stage, 117 and 108 transmitting the power to the output shaft. In the third forward gear, the clutch K3 and the brake B are engaged and the power is transmitted by the gears 115, 103, 203, 112, 105, 107, planetary stage, 117 and 108. The fourth forward gear results by engaging the brake B and of the clutch K4; the power is transmitted by the gears 115, 103, 203, 112, 105, 107, planetary stage, 117 and 108 to the output shaft. In the fifth gear, the clutches K1 and K are engaged, the power being transmitted by the gears 115, 103, 110, 105, 107, 117 and 108 to the output shaft 8. According to FIG. 2, for the sixth forward gear the clutches K2 and K are engaged, the gears 115, 104, 111, 106, 107, 117 and 108 transmitting the power to the output shaft 8. In addition, the seventh forward gear results by engaging the clutches K3 and K; the power is transmitted by the gears 115, 103, 203, 112, 105, 107, 117 and 108. To engage the eighth forward gear, the clutches K4 and K are engaged so that the power is transmitted via the gears 115, 104, 204, 113, 106, 107, 117 and 108 to the output shaft 8.

The first reverse gear results by engaging the synchronizer unit of the clutch K1 and of the brake B; the power is here transmitted by the gears 116, 202, 102, 104, 115, 103, 110, 105, 107, planetary stage, 117 and 108 to the output shaft 7. The second reverse gear is engaged by engaging the clutch K2 and the brake B; the power is transmitted from the input shaft 1 via the gears 116, 202, 102, 103, 111, 106, 107, planetary stage, 117 and 118 to the output shaft 8. In the third reverse gear, the clutch K3 and the brake B are engaged so that the power is transmitted via the gears 116, 202, 102, 104, 115, 103, 203, 112, 105, 107, planetary stage, 117, 108. The fourth reverse gear results by engaging the clutch K4 and the brake B, the power being transmitted via the gears 116, 202, 102, 104, 204, 113, 106, 107, planetary stage, 117 and 108 to the output shaft 8.

In addition, the fifth reverse gear results by engaging the clutches K1 and K, the power being transmitted by the gears 116, 202, 102, 104, 115, 103, 110, 105, 107, 117 and 108. According to the invention, the sixth reverse gear is engaged by engaging the clutches K2 and K, the power being transmitted via the gears 116, 202, 102, 104, 111, 106, 107, 117 and 108 to the output shaft 8. In the seventh gear, the clutches K3 and K are engaged the power being transmitted by the gears 116, 202, 102, 104, 115, 103, 203, 112, 105, 107, 117 and 108. Finally, the clutches K4 and K are engaged for the eighth reverse gear; the gears 116, 202, 102, 104, 204, 113, 106, 107, 117 and 108 here transmit the power to the output shaft 8.

The ratio of the planetary stage is preferably selected so that in the shaft 4-5 in the eighth gear or 2-3 in the fourth gear for the transmission, according to FIG. 1, a uniform ratio range is achieved. One clutch takes part in each open flow up to the fixed gear 7.

In FIG. 3, a specially advantageous bearing arrangement for the countershaft 7 is shown. In the prior art, for the countershaft 7 having the planetary stage P, a costly support is needed in which, on four bearing points, housing walls are concentrated on the bearings so as to transmit the forces. The bearings are inventively arranged so that one bearing point can be eliminated in the housing.

The countershaft 7 is deposited in the transmission housing with a bearing A07 and in a hollow shaft 17 with a bearing B07. Radial forces are transmitted, on one hand, from the bearing A07 directly to the housing and, on the other hand, from bearing B07, via a bearing B17, to the housing. From the Figure is to be understood that the hollow shaft 17 is deposited with a bearing A17 on the countershaft 7 and with the bearing B17 in the housing. The radial forces of the bearing A17 are proportionately transmitted from the bearings A07 and B07 via bearing B17 to the housing; radial forces of the bearing B17 are directly supported in the housing.

In addition, axial forces are transmitted from the shaft 7, via the bearing A17, to the hollow shaft 17 and from hollow shaft 17, via the bearing A07, to the countershaft 7. The axial forces can thus be always assisted in the housing by the bearings A07 and B17. By virtue of the arrangement of the bearing B07 in the active line of the bearing B17, no added tilting forces act upon the bearing system.

In the inventive embodiment, the output stage can be designed with a longitudinal differential (also disengageable).

The inventive idea makes available for dumpers or loaders transmission having good efficiency and able to transmit high powers. By the construction of the transmission, a great equality of parts can be obtained; most parts needed, except the powershift clutches KV and KR, can have the same construction.

Any structural design, especially any spatial arrangement of the countershafts, of the gears, of the planetary stage and of the shifting elements per se or relative to each other and insofar as technologically significant obviously fall also under the scope of protection of the instant claims without affecting the operation of the transmission such as outlined in the claims even if the designs have not been explicitly shown in the Figures or the description.

| Reference numerals | |
| --- | --- |
| 1 | input shaft |
| 2 | countershaft |
| 3 | countershaft |
| 4 | countershaft |
| 5 | countershaft |
| 6 | countershaft |
| 7 | countershaft |
| 8 | output shaft |
| 17 | shaft |
| 102 | fixed gear or idle gear RL |
| 103 | fixed gear |
| 104 | fixed gear |
| 105 | fixed gear |
| 106 | fixed gear |
| 107 | fixed gear |
| 108 | fixed gear |
| 110 | idle gear |
| 111 | idle gear |
| 112 | idle gear |
| 113 | idle gear |
| 115 | idle gear |
| 116 | idle gear or fixed gear RL |
| 117 | idle gear |
| 202 | fixed gear |
| 203 | fixed gear |
| 204 | fixed gear |
| KV | forward cutch |
| KR | reverse clutch |
| K1 | clutch |
| K2 | clutch |
| K3 | clutch |
| K5 | clutch |
| K | clutch |
| B | brake |
| G | housing |
| P | planetary stage |
| S | sun gear |
| H | hollow gear |
| SR | synchronizer unit or dog clutch |
| SV | synchronizer unit or dog clutch |
| A07 | bearing |
| A17 | bearing |
| B07 | bearing |
| B17 | bearing |

The invention claimed is:

1. A shiftable multispeed reverse transmission comprising an input shaft (1) and first, second, third, fourth, fifth, sixth countershafts (2, 3, 4, 5, 6, 7), one or more fixed gears and idle gears being mounted on the first, the second, the third, the fourth, the fifth, the sixth countershafts (2, 3, 4, 5, 6, 7), the idle gears being non-rotatably connected with the countershafts via shiftable clutches for one of gear or direction change, and an output shaft (8), the reverse transmission has first, second, third and fourth forward gears and first, second, third and fourth reverse gears, a first fixed gear (116) and a first idle gear (115) connected with the input shaft (1) via a first forward clutch (KV) for the four forward gears, the first fixed gear (116) on the input shaft (1) being in constant mesh with a second fixed gear (202) on the first countershaft (2) upon which a reverse clutch (KR) is situated, a second idle gear (102) is connectable via the reverse clutch (KR) with the first countershaft (2) and is in constant mesh with a third fixed gear (104), the third fixed gear (104) is additionally in constant mesh with the first idle gear (115) situated upon the input shaft (1) and non-rotatably connected with the third countershaft (4) upon which are situated a fourth fixed gear (204) and a third idle gear (111), the third idle gear (111) is connectable via a third clutch (K2) for gear change and in constant mesh with a fifth fixed gear (106) situated upon the fifth countershaft (6), and the fourth fixed gear (204) is in constant mesh with a fourth idle gear (113) situated on the fifth countershaft (6) which is capable of being connected via a fourth shiftable clutch (K4), with the fifth countershaft (6), the fifth fixed gear (106) situated on the fifth countershaft (6) being in constant mesh with a sixth fixed gear (107) and the sixth fixed gear (107) being non-rotatably connected with the sixth countershaft (7) and a sun gear (S) of a planetary stage (P), and the output shaft (8) is non-rotatably connected with a seventh fixed gear (108) which is in constant mesh with a fifth idle gear (117), the fifth idle gear (117) being non-rotatably connected with a planet carrier of the planetary stage (P), a hollow shaft of the planetary stage (P) being connectable either, via a brake (B), with a housing (G) or, via a fifth clutch (K), with the sun gear (S).

2. The reverse transmission according to claim 1, wherein the first forward gear is engaged by engaging the first forward clutch (KV), the third clutch (K2) and the brake (B), the second forward gear is engaged by engaging the first forward clutch (KV), the fourth shiftable clutch (K4) and the brake (B) the third forward gear is engaged by engaging the first forward clutch (KV), the third clutch (K2) and the fifth clutch (K) of the planetary stage (P), and the fourth forward gear is engaged by engaging the first forward clutch (KV), the fourth shiftable clutch (K4) and the fifth clutch (K) of the planetary stage (P).

3. The reverse transmission according to claim 1, wherein the first reverse gear is engaged by engaging the reverse clutch (KR), the third clutch (K2) and the brake (B), the second reverse gear is engaged by engaging the reverse clutch (KR), the fourth shiftable clutch (K4) and the brake (B), the third reverse gear is engaged by engaging the reverse clutch (KR), the third clutch (K2) and the fifth clutch (K) of the planetary stage (P), and the fourth reverse gear is engaged by engaging the reverse clutch (KR), the fourth shiftable clutch (K4) and of the fifth clutch (K) of the planetary stage (P).

4. The reverse transmission according to claim 1, wherein a uniform ratio range is obtained by translation of the planetary stage (P) by shifting from the second gear to the third gear.

5. A shiftable multispeed reverse transmission comprising an input shaft (1) and first, second, third, fourth, fifth, sixth countershafts (2, 3, 4, 5, 6, 7), one or more fixed gears and idle gears being mounted on the first, the second, the third, the fourth, the fifth, the sixth countershafts (2, 3, 4, 5, 6, 7), and the idle gears being non-rotatably connected with the countershafts via shiftable clutches for one of gear or direction change, and an output shaft (8), the reverse transmission has first, second, third, fourth, fifth, sixth, seventh and eighth forward gears and first, second, third, fourth, fifth, sixth, seventh and eighth reverse gears, a first idle gear (115), situated upon the input shaft (1) is connected with the input shaft (1) via a forward clutch (SV) which is one of a synchronizer unit or dog clutch for the eight forward gears, the first idle gear (115) being in constant mesh with a first fixed gear (103) which is situated on the second countershaft (3) upon which a second idle gear (110) and a first shift clutch (K1), by way of which the second idle gear (110) can be connected with the first countershaft (3), and a second fixed gear (203) non-rotatably connected with the first countershaft (3) are situated, and upon the input shaft (1) is situated a third idle gear (116) connectable with the input shaft (1) via a reverse clutch (SR) in the form of one of the synchronizer unit or the dog clutch for the eight reverse gears, the third idle gear (116) being in constant mesh with a third fixed gear (202) upon a first shaft (2) upon which a fourth fixed gear (102) is situated, and the fourth fixed gear (102) is in constant mesh with a fifth fixed gear (104) which in addition is in constant mesh with the first idle gear (115) situated on the input shaft (1), the fifth fixed gear (104) is non-rotatably connected with the third countershaft (4) upon which is situated a sixth fixed gear (204) and a fourth idle gear (111) connectable via a second clutch (K2) for a gearshift, the fourth idle gear (104) is in constant mesh with a seventh fixed gear (106) situated on the fifth countershaft (6) and connectable via a third shift clutch (K4) with a fifth idle gear (113) in constant mesh with the sixth fixed gear (204) of the third countershaft (4), the seventh fixed gear (106) situated on the fifth countershaft (6) being in constant mesh with an eighth fixed gear (107) situated on the sixth countershaft (7) and the eighth fixed gear (107) is non-rotatably connected with the sixth countershaft (7) and with a sun gear (S) of a planetary stage (P), the output shaft (8) is non-rotatably connected a ninth fixed gear (108) which is in constant mesh with a sixth idle gear (117), and the sixth idle gear (117) being non-rotatably connected with a planet carrier of the planetary stage (P), a hollow gear of the planetary stage (P) being connectable, via a brake (B), with a housing (G) or, via a fourth clutch (K), with the sun gear (S), the eighth fixed gear (107) situated on the sixth countershaft (7) is additionally in constant operative connection with a tenth fixed gear (105) situated on the fourth countershaft (5), a seventh idle gear (112) on the fourth countershaft (5) being connectable via a fifth shift clutch (K3) with the fourth countershaft (5), the tenth fixed gear (105) situated upon the fourth countershaft (5) being in constant mesh with the second idle gear (110) which, via the first shift clutch (K1), can be connected with the second countershaft (3) and the second fixed gear (203) of the second countershaft (3) is in constant operative connection with the seventh idle gear (112) of the fourth countershaft (5).

6. The reverse transmission according to claim 5, wherein the first forward gear is engaged by engaging the forward clutch (SV), the first shift clutch (K1) upon the second countershaft (3) and the brake (B), the second forward gear is engaged by engaging the forward clutch (SV), the second clutch (K2) of the third countershaft (4) and the brake (B), the third forward gear is engaged by engaging the forward clutch (SV), the fifth clutch (K3) and the brake (B), the fourth forward gear is engaged by engaging the forward clutch (SV), the third clutch (K4) and of the brake (B), the fifth forward gear is engaged by engaging the forward clutch (SV), the first shift clutch (K1) and the fourth clutch (K) of the planetary stage (P), the sixth forward gear is engaged by engaging the forward clutch (SV), the second clutch (K2) and the first clutch (K) of the planetary stage (P), the seventh forward gear is engaged by engaging the forward clutch (SV), the third clutch (K3) and the clutch (K) of the planetary stage (P), and the eighth forward gear is engaged by engaging the forward clutch (SV), the third clutch (K4) and the first clutch (K) of the planetary stage (P).

7. The reverse transmission according to claim 5, wherein the first reverse gear is engaged by engaging the reverse clutch (SR), the first shift clutch (K1) and the brake (B), the second reverse gear is engaged by engaging the reverse clutch (SR), the second clutch (K2) and the brake (B), the third reverse gear is engaged by engaging the reverse clutch (SR), the fifth clutch (K3) and the brake (B), the fourth reverse gear is engaged by engaging the reverse clutch (SR), the third clutch (K4) and the brake (B), the fifth reverse gear is engaged by engaging the reverse clutch (SR), the first shift clutch (K1) and the fourth clutch (K) of the planetary stage (P), the sixth reverse gear is engaged by engaging the reverse clutch (SR), the second clutch (K2) and the fourth clutch (K) of the planetary stage (P), and the eighth reverse gear is engaged by engaging the reverse clutch (SR), the third clutch (K4) and the second clutch (K) of the planetary stage (P).

8. The reverse transmission according to claim 5, where a ratio of the planetary stage (P) is selected so that by changing from the fourth gear to the fifth gear, a uniform ratio range is obtained.

* * * * *